(12) United States Patent
Shan et al.

(10) Patent No.: US 12,547,427 B2
(45) Date of Patent: Feb. 10, 2026

(54) DESERIALIZATION METHOD AND APPARATUS, AND COMPUTING DEVICE

(71) Applicant: HUAWEI CLOUD COMPUTING TECHNOLOGIES CO., LTD., Gui'An New District (CN)

(72) Inventors: Weihua Shan, Xi'an (CN); Xuliang Li, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 883 days.

(21) Appl. No.: 17/030,003

(22) Filed: Sep. 23, 2020

(65) Prior Publication Data

US 2021/0004243 A1 Jan. 7, 2021

Related U.S. Application Data

(63) Continuation of application No. PCT/CN2018/093920, filed on Jun. 30, 2018.

(51) Int. Cl.
*G06F 9/448* (2018.01)
*G06F 9/50* (2006.01)
*G06F 12/02* (2006.01)

(52) U.S. Cl.
CPC .......... *G06F 9/4493* (2018.02); *G06F 9/5016* (2013.01); *G06F 12/0253* (2013.01)

(58) Field of Classification Search
CPC .. G06F 9/4493; G06F 9/5016; G06F 12/0253; G06F 9/548
See application file for complete search history.

(56) References Cited

U.S. PATENT DOCUMENTS 6,240,498 B1   5/2001 Dickes et al.
6,275,916 B1 *  8/2001 Weldon, Jr. .......... G06F 9/4488
                                                711/170
(Continued)

FOREIGN PATENT DOCUMENTS

CN   101122852 A   2/2008
CN   104360865 A   2/2015
(Continued)

OTHER PUBLICATIONS

IBM Publication "Process of Pooling Persisted Objects", IPCOM, p. 1. (Year: 2005).*
Yang et al. CN 106155630 English Translation (Year: 2016).*
Ren et al. "Generational Garbage Collection Algorithm Based on Lifespan Prediction", 2016 IEEE 4th International Conference on Future Internet of Things and Cloud Workshops (FiCloudW) (pp. 183-187). I (Year: 2016).*
(Continued)

*Primary Examiner* — Bing Zhao
*Assistant Examiner* — Willy W Huaracha
(74) *Attorney, Agent, or Firm* — Leydig, Voit & Mayer, Ltd.

(57) ABSTRACT

This application discloses a deserialization method. A first object shell of a first object is created in memory space of a process, where the first object shell includes a first object header and a first object body; a serialization result of the first object is obtained; the serialization result of the first object is deserialized based on the first object shell, to obtain the first object; and after the first object is used by the process, the first object shell is released, where the first object shell may be used to deserialize a subsequently received serialization result. Deserialization efficiency is improved by reusing an object shell.

13 Claims, 13 Drawing Sheets

(56) References Cited

U.S. PATENT DOCUMENTS

| | | | | |
|---|---|---|---|---|
| 6,928,488 | B1* | 8/2005 | de Jong | G06F 9/4493 709/246 |
| 8,209,701 | B1* | 6/2012 | Roytman | G06F 9/5027 718/106 |
| 8,935,662 | B2* | 1/2015 | Pasternak | G06F 9/4493 717/115 |
| 10,467,321 | B2* | 11/2019 | Webster | G06F 9/4488 |
| 2001/0056522 | A1* | 12/2001 | Satyanarayana | G06F 9/4493 711/170 |
| 2009/0064206 | A1* | 3/2009 | Olderdissen | G06F 9/547 719/330 |
| 2012/0210299 | A1* | 8/2012 | Pasternak | G06F 9/4493 717/115 |
| 2013/0139134 | A1 | 5/2013 | Burka et al. | |
| 2016/0070593 | A1 | 3/2016 | Harris et al. | |
| 2019/0073430 | A1* | 3/2019 | Webster | G06F 16/25 |
| 2020/0278876 | A1* | 9/2020 | Douglas | G06F 8/4441 |

FOREIGN PATENT DOCUMENTS

| | | | |
|---|---|---|---|
| CN | 104461745 | A | 3/2015 |
| CN | 106155630 | A | 11/2016 |
| CN | 106250242 | A | 12/2016 |
| CN | 106294385 | A | 1/2017 |
| CN | 106570018 | A | 4/2017 |
| CN | 107341262 | A | 11/2017 |
| CN | 107463668 | A | 12/2017 |

OTHER PUBLICATIONS

Yang et al. CN 106155630 English Translation update (Year: 2016).*

Ren et al., "Generational Garbage Collection Algorithm Based on Lifespan Prediction," 2016 4th International Conference on Future Internet of Things and Cloud Workshops (FiCloudW), Vienna, Austria, pp. 183-187, XP032978983, Institute of Electrical and Electronics Engineers, New York, New York (Aug. 2016).

"Reducing Memory Management Activity in a Virtual Machine through the use of Internal Object Pools," IP.com Journal, IP.com No. IPCOM000251646D, Total 7 pages, XP013176460 (Nov. 21, 2017).

Ross et al., "Object Serialization Support for Object Oriented Java Processors," 2008 International Symposium on Information Technology, Kuala Lumpur, Malaysia, Total 6 pages, XP031326139, Institute of Electrical and Electronics Engineers, New York, New York (Aug. 2008).

"Process of Pooling Persisted Objects," IP.com Journal, Total 1 page, XP013022932 (Jan. 21, 2005).

Tuoluofo "I don't want to use new, I want to use object pooling, but the deserialization of JSON is all back objects, and there is no incoming object that has been created. What to do.," CSDN, https://bbs.csdn.net/topics/390746638, Total 6 pages (Mar. 30, 2014). With an English machine translation.

* cited by examiner

EventData1
{
  seqNo:54;      ——— Serialize ——▶                    Serialization result
  creatTime:78;
  String:"abc";  ◀— Deserialize —  [54 78 61 62 63 12 23]
  data:[12,23];
  ...
}

DESERIALIZATION METHOD AND APPARATUS, AND COMPUTING DEVICE

CROSS-REFERENCE TO RELATED APPLICATIONS

This application is a continuation of International Application No. PCT/CN2018/093920, filed on Jun. 30, 2018, the disclosure of which is hereby incorporated by reference in its entirety.

TECHNICAL FIELD

This application relates to the field of computer technologies, and in particular, to a deserialization method, a corresponding apparatus, and a computing device configured to perform the method.

BACKGROUND

Object-oriented programming languages such as Java and Python are widely used in business scenarios. Each object may be personal information of a customer, attribute information of a product, or the like. In a procedure in which these objects are used, a serialization operation and a deserialization operation need to be performed on a large quantity of objects. For the deserialization operation, an object needs to be recreated in memory space. In the prior art, to obtain an object through deserialization, the entire object needs to be recreated in the memory space. Consequently, efficiency is low.

SUMMARY

This application provides a deserialization method, so that deserialization efficiency is improved by using the method.

A first aspect of this application provides a deserialization method, and the method is performed by a computing device. In an initialization phase, a first object shell of a first object is created in memory space of a process, where the first object shell includes a first object header and a first object body, the first object header includes a type pointer of the first object, and space is reserved in the first object body for an element of the first object. A size of space reserved for an element of a basic type depends on a specific basic type of the element. Sizes of space needed by elements of different basic types may be different. A pointer is stored in space reserved for an element of a reference type, and therefore a size of the space reserved for the element of the reference type is generally 32 bits or 64 bits. A serialization result of the first object is obtained. The first object shell is obtained, and the serialization result of the first object is deserialized based on the first object shell, to obtain the first object. Optionally, after the first object is used by the process, the first object shell may be further released for use in subsequent deserialization. In the method, creation of an object shell in a deserialization procedure is avoided by pre-creating the object shell, thereby improving deserialization efficiency. In addition, the object shell is released, so that the object shell can be reused in the deserialization procedure, thereby avoiding recreating the object shell in each time of deserialization.

In an embodiment, the first object shell is located in old generation memory space of the process. The first object shell may be created in young generation memory space and then aged in the old generation memory space, or may be directly created in the old generation memory space. An object shell in the old generation memory space is used, so that a possibility of young garbage collection, full garbage collection, and memory overflow is reduced, deserialization efficiency is improved, and running stability of a process is improved.

In an embodiment, the first object shell is located in an object pool corresponding to a class to which the first object belongs, the object pool corresponding to the class to which the first object belongs includes at least one object shell, and the method further includes: selecting the idle first object shell from the object pool corresponding to the class to which the first object belongs, to deserialize the serialization result of the first object; and after the first object is used by the process, releasing the first object shell, where the released first object shell is idle. The object pool corresponding to the class to which the first object belongs is pre-created in the memory space of the process, an idle object shell is borrowed from the object pool in a procedure of obtaining an object through deserialization, and the borrowed object shell is returned to the object pool after the object is used, thereby avoiding recreation of the entire object.

In an embodiment, the releasing the first object shell includes: clearing the space reserved in the first object body for the element of the first object. Clearing the space reserved in the first object body for the element of the first object is clearing content stored in the reserved memory space, and memory space obtained after clearance still belongs to the object body. Because object headers of same objects are the same, the type pointer stored in the first object header is not cleared in a procedure of releasing the first object shell. Clearing space in an object body ensures that the first object shell can be correctly reused subsequently, and retaining an object header reduces a filling time of the object header, thereby further improving deserialization efficiency.

In an embodiment, the deserializing the serialization result of the first object based on the first object shell, to obtain the first object includes: creating a reference for the first object, where the reference points to the first object shell; and filling the serialization result of the first object into the space reserved in the first object body for the element of the first object. A reference is created, a serialization result is filled into an object body, a complete object is obtained through deserialization in combination with a pre-filled object header, and the object obtained through deserialization can be used by a process.

In an embodiment, the method further includes: creating a second object shell of an object of a reference type in the memory space of the process, where the second object shell includes a second object header and a second object body, the second object header includes a type pointer of the object of the reference type, space is reserved in the second object body for an element of the object of the reference type, and the object of the reference type is an element of the first object. Both the second object shell and the first object shell may be created in the initialization phase. The deserializing the serialization result of the first object based on the first object shell, to obtain the first object includes: filling a pointer pointing to the second object shell into space reserved in the first object body for an element of the reference type; and filling, into the space reserved in the second object body for the element of the object of the reference type, a part that is related to the element of the reference type and that is in the serialization result of the first object. In a procedure of obtaining an object through deserialization, not only an object shell may be used to obtain a parent object through deserialization, but also the object shell may be used to obtain a child object through deserialization, thereby ensuring that deserialization to obtain the child object in case of object nesting can also achieve an effect described in any implementation of this aspect.

In an embodiment, the method further includes: creating, in the memory space of the process, an object pool corresponding to a class to which the object of the reference type belongs, where the object pool corresponding to the class to which the object of the reference type belongs includes at least one object shell; selecting the idle second object shell from the object pool corresponding to the class to which the object of the reference type belongs; and after the first object is used by the process, releasing the first object shell and the second object shell, where the released second object shell is idle. The second object shell and the first object shell are located in different object pools, and creation and use procedures of the second object pool and the first object pool are the same.

In an embodiment, after the releasing the first object shell, the method further includes: obtaining a serialization result of a second object, where the second object and the first object belong to a same class; and obtaining the released first object shell, and deserializing the serialization result of the second object based on the released first object shell, to obtain the second object. In a procedure of obtaining the second object through deserialization, the method for obtaining the first object through deserialization in any one of the foregoing implementations may be used. An object shell in a same object pool can be reused in a deserialization procedure for objects obtained by instantiating a same class. After a previous object is used, an object shell borrowed for the object is released for obtaining a subsequent object through deserialization. An object shell is reused, thereby avoiding creation of a complete object or creation of the object shell in each time of deserialization, and improving deserialization efficiency.

In an embodiment, in a running procedure of the process, it may be further determined, based on a class to which an object corresponding to a received serialization result belongs, that an object shell needs to be newly added to the object pool corresponding to the class to which the first object belongs, or that an object shell needs to be newly added to the object pool corresponding to the class to which the object of the reference type belongs. Generally, in the running procedure of the process, if a frequency of receiving an object is increased, that is, a deserialization frequency of the object is increased, a quantity of object shells in an object pool corresponding to a class to which the object belongs and a quantity of object shells in an object pool corresponding to a class to which a child object nested in the object belongs need to be increased, to ensure that an idle object shell can be borrowed from the object pool in a procedure of obtaining the object through deserialization.

In an embodiment, in a running procedure of the process, it may be further determined, based on a class to which an object corresponding to a received serialization result belongs, that an object shell needs to be reduced from the object pool corresponding to the class to which the first object belongs, or that an object shell needs to be reduced from the object pool corresponding to the class to which the object of the reference type belongs. Generally, in the running procedure of the process, if a frequency of receiving an object is decreased, that is, a deserialization frequency of the object is decreased, a quantity of object shells in an object pool corresponding to a class to which the object belongs and a quantity of object shells in an object pool corresponding to a class to which a child object nested in the object belongs need to be decreased, to ensure that there is sufficient memory space for use by another object pool.

A second aspect of this application provides a deserialization apparatus, and the apparatus includes an object pool management module and a storage module. The object pool management module is configured to: create a first object shell of a first object in the storage module, where the first object shell includes a first object header and a first object body, the first object header includes a type pointer of the first object, and space is reserved in the first object body for an element of the first object; obtain a serialization result of the first object; and deserialize the serialization result of the first object based on the first object shell, to obtain the first object. Optionally, the object pool management module is further configured to: after the first object is used, release the first object shell. The storage module is configured to store the first object shell. The deserialization apparatus is configured to perform any method provided in the first aspect.

In an embodiment, the first object shell is located in old generation memory space of a process that uses the first object. The storage module includes the old generation memory space of the process.

In an embodiment, the first object shell is located in an object pool corresponding to a class to which the first object belongs, the object pool corresponding to the class to which the first object belongs includes at least one object shell, and the object pool management module is further configured to: select the idle first object shell from the object pool corresponding to the class to which the first object belongs, to deserialize the serialization result of the first object; and after the first object is used, release the first object shell, where the released first object shell is idle.

In an embodiment, the object pool management module is configured to clear the space reserved in the first object body for the element of the first object.

In an embodiment, the apparatus further includes a deserialization module, configured to create a reference of the first object, where the reference points to the first object shell; and the object pool management module is further configured to fill the serialization result of the first object into the space reserved in the first object body for the element of the first object.

In an embodiment, the object pool management module is further configured to: create a second object shell of an object of a reference type in the storage module, where the second object shell includes a second object header and a second object body, the second object header includes a type pointer of the object of the reference type, space is reserved in the second object body for an element of the object of the reference type, and the object of the reference type is an element of the first object; fill a pointer pointing to the second object shell into space reserved in the first object body for an element of the reference type; and fill, into the space reserved in the second object body for the element of the object of the reference type, a part that is related to the element of the reference type and that is in the serialization result of the first object.

In an embodiment, the object pool management module is further configured to: obtain a serialization result of a second object, where the second object and the first object belong to a same class; and obtain the released first object shell, and deserialize the serialization result of the second object based on the released first object shell, to obtain the second object.

A third aspect of this application provides a computing device, including a processor and a memory. The processor is configured to: access a code running process in the memory; create a first object shell of a first object in memory space of the process, where the first object shell includes a first object header and a first object body, the first object header includes a type pointer of the first object, and space is reserved in the first object body for an element of the first object; obtain a serialization result of the first object; and obtain the first object shell, and deserialize the serialization result of the first object based on the first object shell, to obtain the first object. Optionally, the processor may further release the first object shell after the first object is used by the process. The computing device is configured to perform any method provided in the first aspect.

In an embodiment, the first object shell is located in old generation memory space of the process.

In an embodiment, the first object shell is located in an object pool corresponding to a class to which the first object belongs, the object pool corresponding to the class to which the first object belongs includes at least one object shell, and the processor is configured to: select the idle first object shell from the object pool corresponding to the class to which the first object belongs, to deserialize the serialization result of the first object; and after the first object is used by the process, release the first object shell, where the released first object shell is idle.

In an embodiment, the processor is configured to clear the space reserved in the first object body for the element of the first object.

In an embodiment, the processor is configured to: create a reference for the first object, where the reference points to the first object shell; and fill the serialization result of the first object into the space reserved in the first object body for the element of the first object.

In an embodiment, the processor is configured to: create a second object shell of an object of a reference type in the memory space of the process, where the second object shell includes a second object header and a second object body, the second object header includes a type pointer of the object of the reference type, space is reserved in the second object body for an element of the object of the reference type, and the object of the reference type is an element of the first object; fill a pointer pointing to the second object shell into space reserved in the first object body for an element of the reference type; and fill, into the space reserved in the second object body for the element of the object of the reference type, a part that is related to the element of the reference type and that is in the serialization result of the first object.

In an embodiment, the processor is configured to: obtain a serialization result of a second object, where the second object and the first object belong to a same class; and obtain the released first object shell, and deserialize the serialization result of the second object based on the released first object shell, to obtain the second object.

A fourth aspect of this application provides a deserialization method, where the method is performed by a computing device, and includes: obtaining an idle object shell from an object pool, where the object pool is provided with at least one object shell, each object shell is used to obtain a plurality of objects through deserialization, and the plurality of objects belong to a same class; and deserializing a received serialization result based on the idle object shell, to obtain a target object.

In an embodiment, the method further includes: after the target object is used, releasing an object shell of the target object, where the released object shell of the target object is idle.

In an embodiment, the method further includes: receiving another serialization result, and deserializing the another deserialization result based on the released object shell of the target object, to obtain another target object, where the target object and the another target object belong to a same class.

A fifth aspect of this application provides a computing device, including a processor and a memory. The processor is configured to access code in the memory to perform any method provided in the fourth aspect.

A sixth aspect of this application provides a non-transitory readable storage medium, where when the non-transitory readable storage medium is executed by a computing device, the computing device performs any method provided in the first aspect. The storage medium stores a program. The storage medium includes but is not limited to a volatile memory such as a random access memory, and a non-volatile memory such as a flash memory, a hard disk drive (HDD), or a solid state drive (SSD).

A seventh aspect of this application provides a computing device program product, where when the computer program product is executed by a computing device, the computing device performs any method provided in the first aspect. The computer program product may be a software installation package. If any method provided in the first aspect needs to be used, the computer program product may be downloaded, and the computer program product may be executed on the computing device.

BRIEF DESCRIPTION OF DRAWINGS

To describe the technical solutions in the embodiments of this application more clearly, the following briefly describes the accompanying drawings required for the embodiments.

DESCRIPTION OF EMBODIMENTS

The following describes the technical solutions in the embodiments of this application with reference to the accompanying drawings in the embodiments of this application.

In this application, there is no logical or temporal dependency among the "first", the "second", and the "n$^{th}$".

In this application, a class library includes a plurality of classes, and each class records definition information of the class, namely, meta information of an object obtained by instantiating the class. The class library is also referred to as a type system. A class includes at least one element. Content recorded in each class includes a class name, an element type of each element of the class, and an element name of each element of the class. An object is obtained by instantiating a class, the object belongs to the class, and the object includes an element of the class. Each object includes an object name, an element name of each element of the object, and an element value of each element of the object. An element name of each element of an object and a type of an element value of the element are inherited from an element name and an element type of each element of a class of the object obtained through instantiation.

Figure 1:
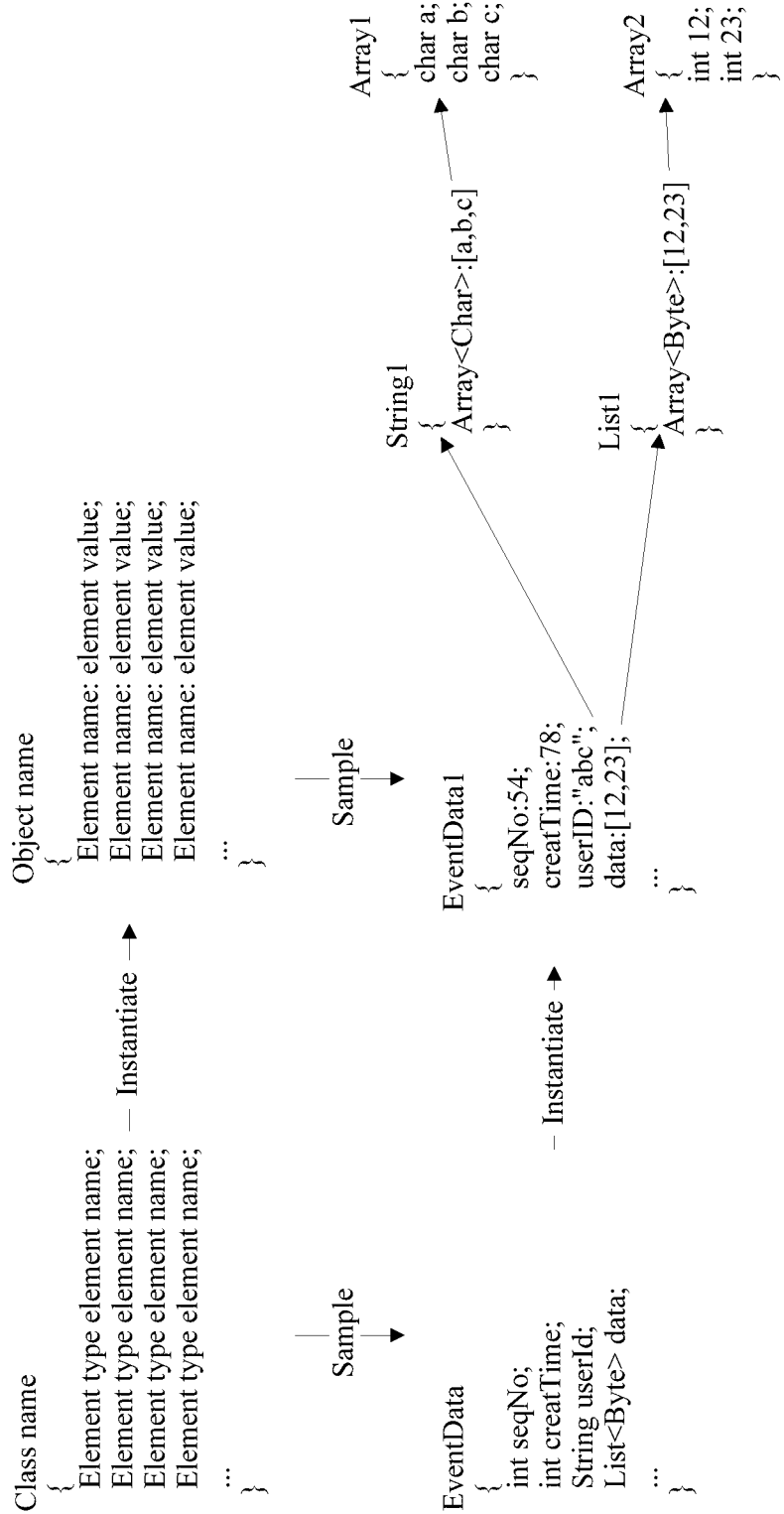
FIG. 1 is a schematic structural diagram of a class and an object according to this application.

FIG. 1 shows definition information of a class. EventData is a class name. The class includes four elements: int seqNo/int creatTime/String userId/List<Byte> data, where int/int/String/List<Byte> are element types of the four elements, and seqNo/creatTime/userId/data are element names of the four elements. EventData may be instantiated into EventData1, and there is a one-to-one correspondence between definitions of the elements in EventData and those of elements in EventData1, for example, int seqNo corresponds to seqNo: 54. An element type of an element value 54 of an element name seqNo in EventData1 is inherited from the element type int of the element name seqNo in EventData.

The element type is a basic type or a reference type. A length of an element of the basic type is fixed. Basic types include byte (8 bits), short (16 bits), long (64 bits), int (32 bits), float (32 bits), double (64 bits), char (16 bits), and boolean (a length depends on a compiling environment).

A length of an element of the reference type is generally not fixed, and reference types include a class, an interface, an array, enumeration, an annotation, and the like. An element that is of the reference type and that is of an object may be an element of the basic type or another object (that is, an object is nested in an object). In an object nesting scenario, an element of an object nested at the last layer is of the basic type. For example, userID points to an object String1, an element Array<Char> of String1 points to an object Array1, and an element of Array1 is of a basic type char. For another example, data points to an object List1, an element Array<Byte> of List1 points to an object Array2, and an element of Array2 is of a basic type Byte.

Figures 2, 3A:
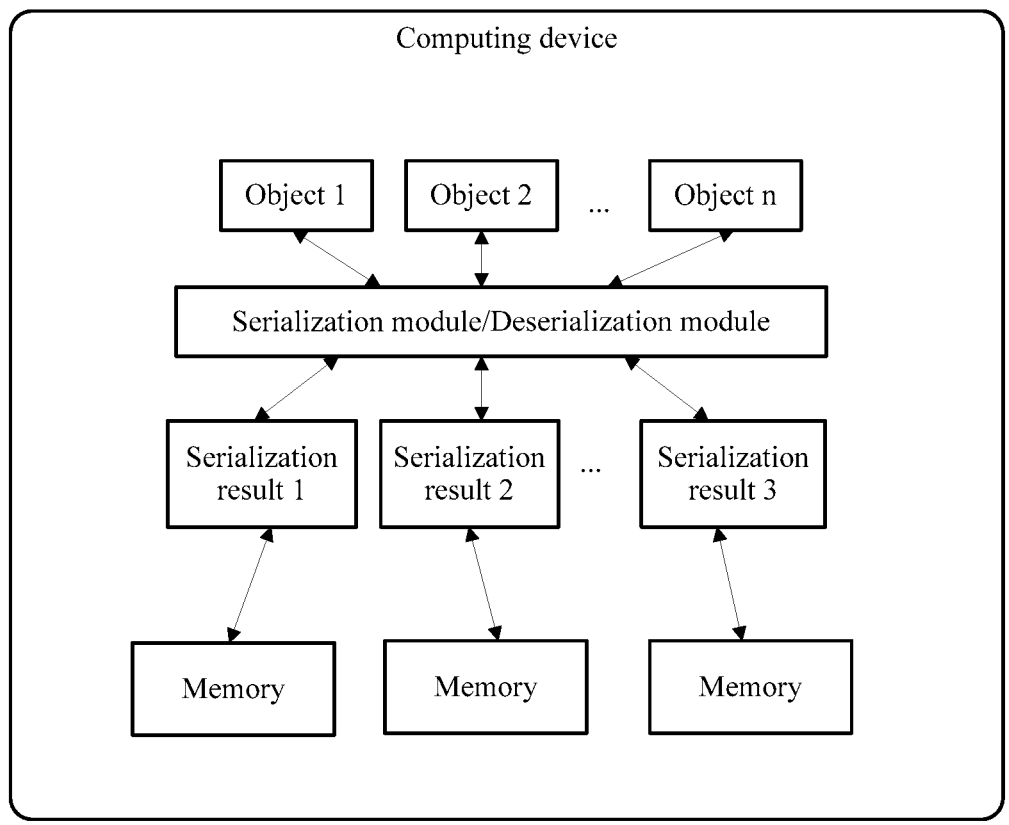
FIG. 2 is a schematic diagram of object serialization according to this application.
FIG. 3a is a schematic diagram of an application scenario of serialization and deserialization according to this application.

As shown in FIG. 2, in this application, a procedure in which the object EventData1 or another data structure is converted into a format that can be stored in a file or memory or is converted into a format that can be transmitted on a communications path is referred to as serialization. Conversely, a procedure in which the format is converted into an original object or an original data structure is referred to as deserialization. A serialization result is a binary sequence or a string sequence. Serializing an object may also mean marshaling/pickling/flattening the object, and names of serialization may be different in different programming languages.

Serialization and deserialization mainly include the following two scenarios. As shown in FIG. 3a, an object in memory space needs to be stored in a non-volatile memory for long-term storage. A serialization module converts the object into a serialization result, and stores the serialization result into the memory. When the object needs to be accessed, the serialization result is read from the memory, and is converted into the object by using a deserialization module. The serialization module and the deserialization module in FIG. 3a may be two independent modules. Because serialization and deserialization are inverse procedures of each other, the serialization module and the deserialization module may alternatively be integrated into one module.

Figure 3B:
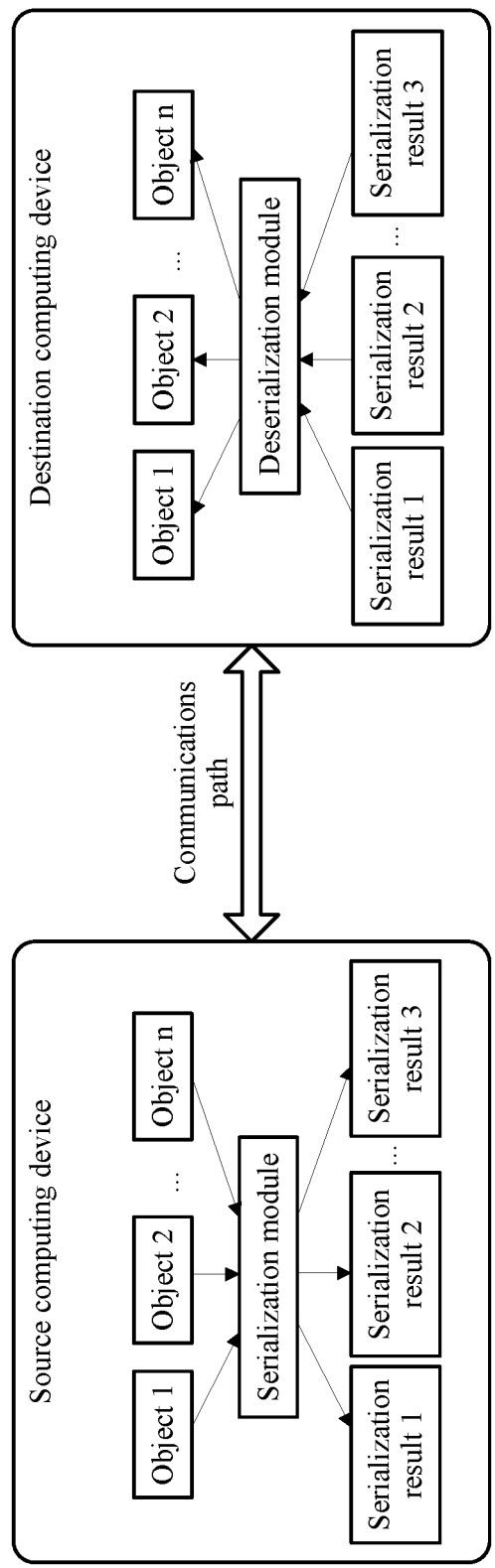
FIG. 3b is a schematic diagram of another application scenario of serialization and deserialization according to this application.

As shown in FIG. 3b, an object of a source computing device (for example, a client) needs to be sent to a destination computing device (for example, a server). A serialization module of the source computing device converts the object into a serialization result. The source computing device encapsulates the serialization result as a data packet, and sends the data packet to the destination computing device by using a communications path. The destination computing device obtains the serialization result after decapsulating the data packet, and converts the serialization result into the object by using a deserialization module. The following example is used: The source computing device is a client of a financial company, and the destination computing device is a virtual machine in a cloud environment. The financial company sets a customer authentication function in the cloud environment, and therefore the financial company needs to send, to the virtual machine in the cloud environment, customer information received by the client. The virtual machine obtains the customer information, and determines whether a customer can be successfully authenticated. The client of the financial company obtains customer information EventData1 that is input by the customer when the customer logs in to an account. The client serializes EventData1, and then sends a serialization result to the virtual machine on the cloud. The virtual machine deserializes the serialization result, to reconstruct the customer information EventData1. As service types and a quantity of customers grow, a quantity of deserialization results obtained by the virtual machine per unit of time continuously increases, and this imposes a higher requirement for a deserialization speed.

Figure 4A:
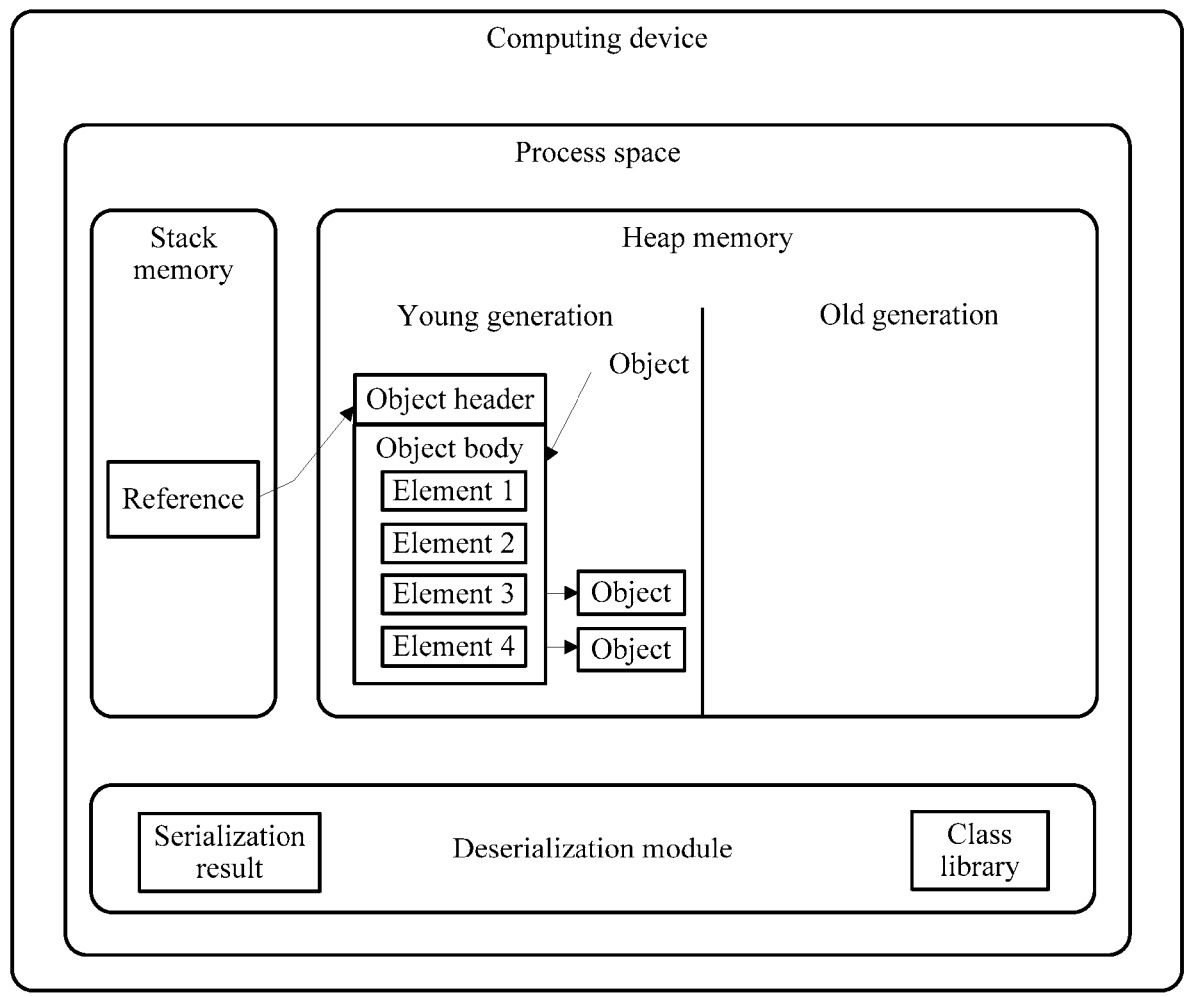
FIG. 4a is a schematic structural diagram of a computing device according to this application.

This application is applicable to various language environments that include Java, Python, C#, and the like. Names of space in which a process runs are also different in different language environments, for example, a Java process runs in a Java virtual machine (JVM). The process herein may also be an application program or a part of an application program. As shown in FIG. 4a, memory space of the process includes stack memory, heap memory, and a deserialization module (generally, a serialization module is further included and is not shown in the figure, or the serialization module and the deserialization module are integrated into one module). A class library is stored in the deserialization module, or is stored in another part of the memory space of the process. The heap memory falls into a young generation and an old generation. When the process needs to invoke an object, the deserialization module obtains a serialization result corresponding to the object, and recreates the object in the stack memory and the heap memory based on the serialization result. The object includes an object header and an object body. A reference of the object is created in the stack memory, and the reference includes a pointer (namely, an address of the object header) pointing to the object header. The object header and the object body of the object are created in the heap memory. The object header includes a type pointer. The type pointer points to a class of the object, that is, the type pointer points to an address in the class library. The class of the object is stored at the address. When accessing the object subsequently, the process needs to obtain the class of the object by using the type pointer, to learn of information about the object, for example, an element name and an element type. Each element is stored in the object body. An element of a basic type may be directly stored in the object body. If an element is of a reference type, a pointer of an object to which the element points may be stored in the object body. For example, in FIG. 4a, an element 1 and an element 2 are of the basic type, and an element 3 and an element 4 are of the reference type. Therefore, a pointer is stored in each of the element 3 and the element 4, and points to an object header of another object.

In the prior art, if a new object needs to be created, the object can be created only in the young generation. Consequently, efficiency of creating the object is low. In addition, when a proportion of objects stored in the young generation to total space of the young generation exceeds a specific value, the process enables young garbage collection. Through young garbage collection, a used object is deleted from the young generation, and an unused object continues to survive in the young generation.

Figure 4B:
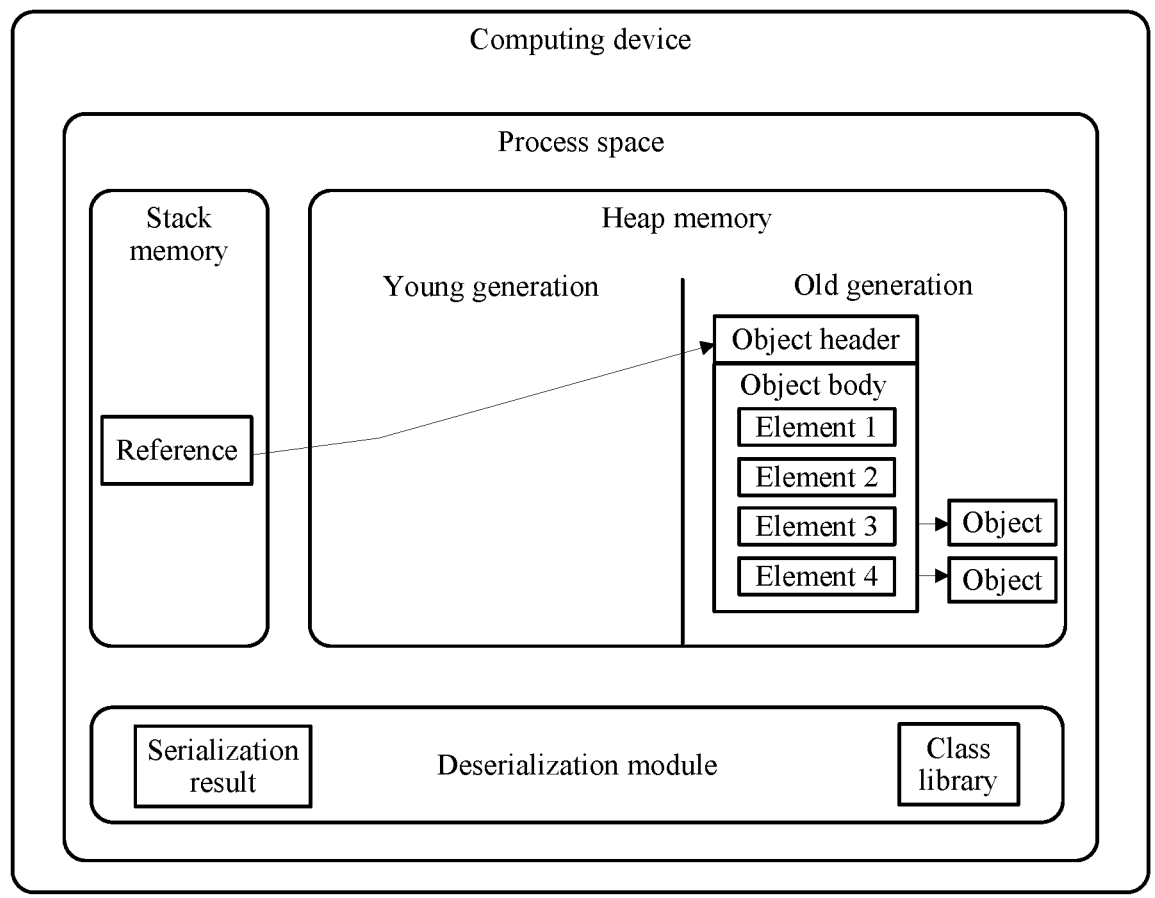
FIG. 4b is a schematic structural diagram of another computing device according to this application.

As shown in FIG. 4b, if a survival time of an object in the young generation exceeds a threshold, or an object still survives in the young generation after a specific quantity of rounds of young garbage collection, the object is copied to the old generation; or if available space in the young generation is less than a threshold, an object in the young generation is copied to the old generation. If there is an excessively large quantity of objects accumulated in the old generation, full garbage collection is triggered to delete a used object in the old generation. Because a size of the old generation is generally much greater than that of the young generation, time overheads of full garbage collection are much higher than time overheads of young generation collection, and all threads in the process are stopped during full garbage collection. Therefore, full garbage collection seriously affects running performance of the process. In addition, if there is an excessively large quantity of unused objects in the old generation, even though full garbage collection is used, old generation memory space is still fully occupied. Consequently, memory overflow is caused, and the process is crashed.

To improve deserialization efficiency, and reduce impacts of young garbage collection, full garbage collection, and memory overflow on running performance and security of the process, this application proposes a method to improve the deserialization efficiency, reduce a quantity of times of triggering young garbage collection and full garbage collection, reduce a possibility of memory overflow, and improve running stability of the process. In the old generation, object pools are set for different classes, and each object pool has at least one object shell. When an object is obtained through deserialization, an object shell is borrowed from an object pool corresponding to a class to which the object to be obtained through deserialization belongs. After the object is used, the borrowed object shell is returned to the object pool of the class to which the object belongs. The object shell may be reused in a deserialization procedure, and there is no need to recreate a new object in each time of deserialization, thereby improving the deserialization efficiency. Furthermore, because there is no need to create an object in the young generation, young garbage collection is avoided. Because young garbage collection is avoided, full garbage collection is also avoided, and the possibility of memory overflow is also greatly reduced.

Figure 5A:
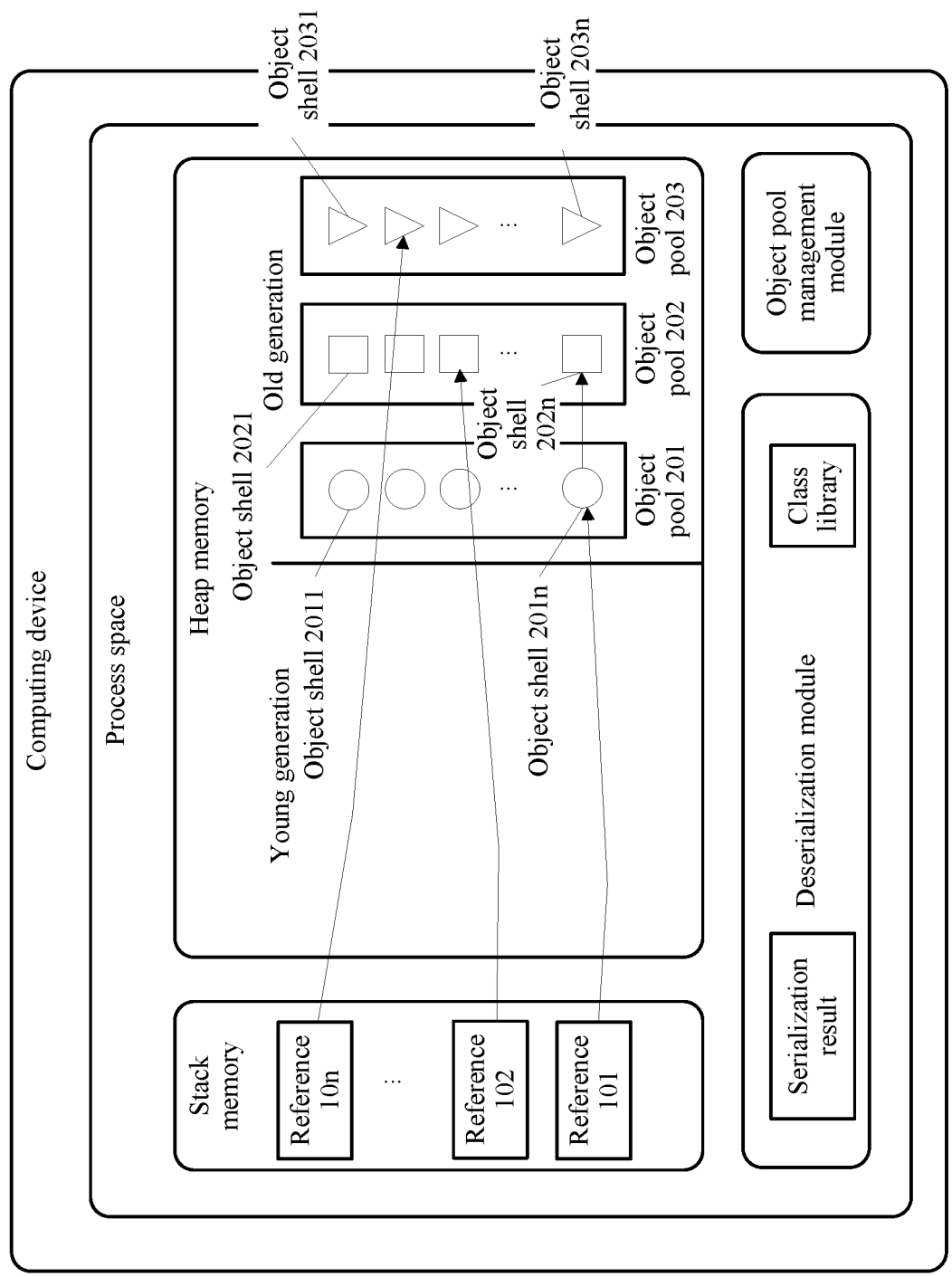
FIG. 5a is a schematic structural diagram of another computing device according to this application.

As shown in FIG. 5a, an object pool management module pre-creates a plurality of object pools in the memory space in an initialization phase, for example, an object pool 201, an object pool 202, and an object pool 203. These object pools may be created in the young generation and then aged in the old generation, or may be directly created in the old generation. Each object pool corresponds to a class. Each object pool includes a plurality of object shells, for example, the object pool 201 includes an object shell 2011, an object shell 2012, . . . , and an object shell 201n. Object shells in an object pool are the same. Object shells in an object pool are used to create an object obtained by instantiating a class corresponding to the object pool. For example, the object shells in the object pool 201 may be used to create a same object. Creation of an object pool corresponding to a class to which an object belongs is earlier than obtaining of the object through deserialization for the first time. At least one object shell is created in each object pool. The object pool management module may create a corresponding object pool for each object that needs to be invoked by the process, and may create a corresponding object pool for each class nested in the invoked object. A quantity of object shells pre-allocated by the object pool management module to an object pool depends on an estimated frequency that an object obtained by instantiating a class corresponding to the object pool is invoked. Generally, if an estimated frequency that an object is invoked is higher, a quantity of object shells in an object pool of a class to which the object belongs is larger.

Figure 5B:
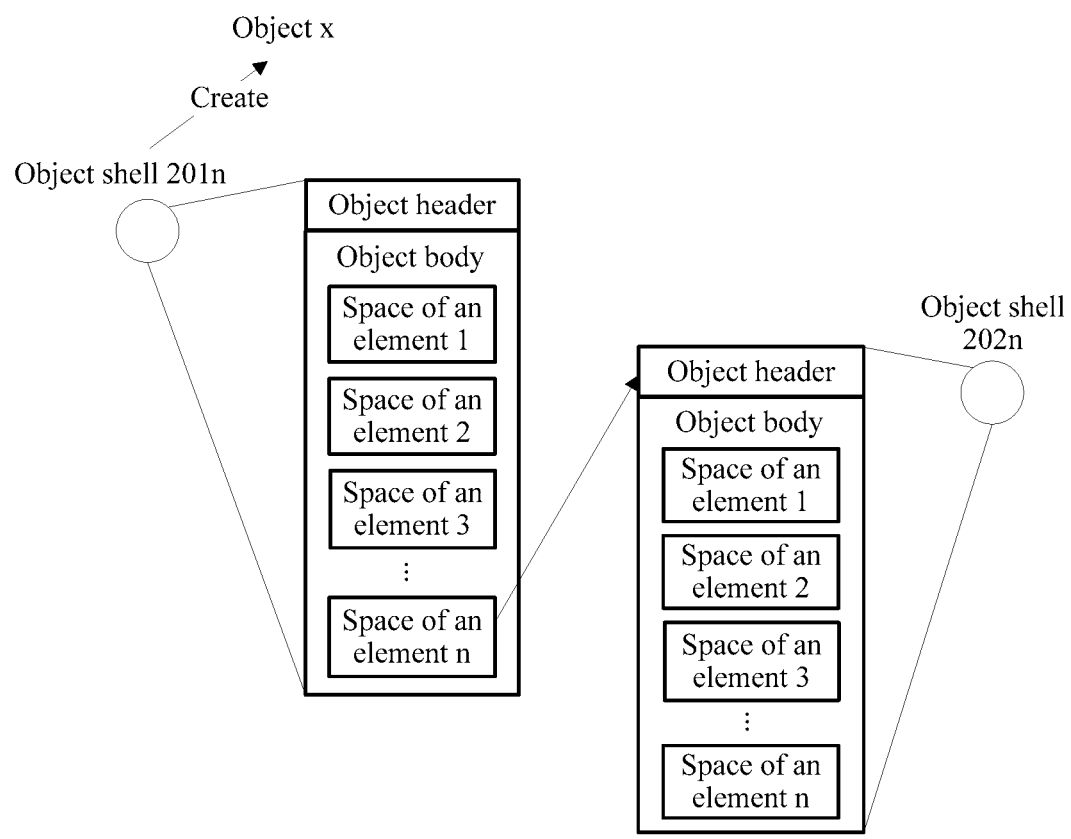
FIG. 5b is a schematic structural diagram of an object shell according to this application.

As shown in FIG. 5b, a structure of an object shell is described by using the object shell 201n as an example. The object shell 201n is used to create an object x, that is, the object pool 201 corresponds to the object x. The object shell 201n includes two parts: an object header and an object body. The object header of the object shell 201n includes a type pointer, and the type pointer points to a class to which the object x belongs. Space is reserved in the object body of the object shell 201n for each element of the object x, and the reserved space is occupied by the object shell 201n. A size of space reserved in the object body for an element of a basic type is a size of the element of the basic type. A size of space reserved in the object body for an element of a reference type is a size of a pointer, namely, 32 bits or 64 bits. Specifically, whether 32 bits or 64 bits are used depends on an operating system used for the process. Because the element of the reference type is essentially an object, a pointer stored in the space of the element of the reference type actually points to an object header of an object shell in another object pool.

When an object is obtained through deserialization, the deserialization module first establishes a reference corresponding to the object in the stack memory. A reference 101 is used as an example. The object pool management module determines the object pool 201 corresponding to a class to which the object belongs. In FIG. 5, the reference 101, a reference 102, and a reference 10n belong to different objects. Then, the object pool management module obtains the currently idle object shell 201n from the object pool 201, and fills each element of the object into the object body of the object shell 201n. The idle object shell 201n may be used and released in a procedure of creating another object, or the idle object shell 201n may not be used after being created. If a filled element is of the reference type, a pointer is filled into corresponding element space. The pointer points to an object shell that is of the element of the reference type and that is in another object pool. For example, if an element n of the object shell 201n is of the reference type, a pointer is stored in space of the element n of the object shell 201n, and points to an object shell 202n in the object pool 202. The object pool management module maintains object pool status information, and the object pool status information records which object shell is idle and which object shell is being borrowed in each object pool.

Figure 6:
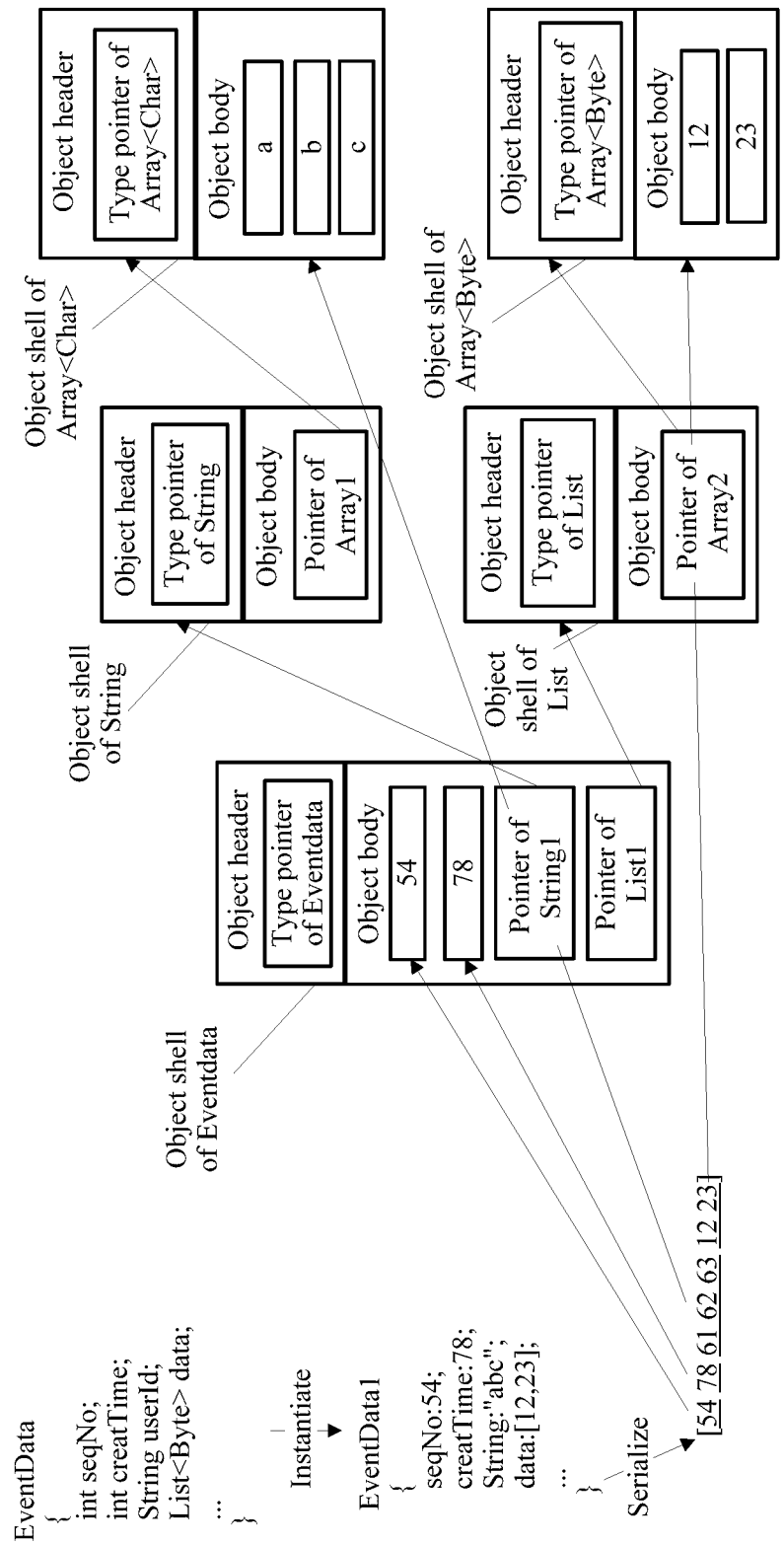
FIG. 6 is a schematic diagram of a serialization result and an object obtained through deserialization according to this application.

In FIG. 6, an example in which the object EventData1 is obtained through deserialization is used. After obtaining a serialization result (a binary sequence) of EventData1, the deserialization module obtains an object shell of EventData from an object pool corresponding to EventData. After the class library is accessed, it is learned, by using the class EventData, that the first element of the object EventData1 is of a basic type int and the second element is of the basic type int. Therefore, 54 and 78 are respectively filled into the first element space and the second element space in an object body of EventData. It is also learned, by using the class EventData, that the third element of the object EventData1 is of a reference type String and the fourth element is of a reference type List. An object shell of String (which may be specifically StringBuilder or StringBuffer) is obtained from an object pool corresponding to String, and a pointer pointing to the object shell of String is filled into the third element space in the object body of EventData. An object shell of List is obtained from an object pool corresponding to List, and a pointer pointing to the object shell of List is filled into the fourth element space in the object body of EventData. It is also learned, by using a class String, that an element of an object String is of a reference type Array<Char>. An object shell of Array<Char> is obtained from an object pool corresponding to Array<Char>, and a pointer pointing to the object shell of Array<Char> is filled into element space in an object body of String. It is also learned, by using a class List, that an element of an object List is of a reference type Array<Byte>. An object shell of Array<Byte> is obtained from an object pool corresponding to Array<Byte>, and a pointer pointing to the object shell of Array<Byte> is filled into element space in an object body of List. It is learned, by using a class Array<Char>, that an element of an object Array<Char> is of a basic type Char. 61, 62, and 63 (ASCII code (American standard code for information interchange)) are converted into a, b, and c, and are respectively filled into the first, second, and third element space of Array<Char>. It is learned, by using a class Array<Byte>, that an element of an object Array<Byte> is of a basic type Byte. 12 and 23 are respectively filled into the first and second element space of Array<Byte>. At this point, the object EventData1 is obtained through deserialization by using the serialization result of EventData1. The object shell of Eventdata, the object shell of String, the object shell of List, the object shell of Array<Char>, and the object shell of Array<Byte> are respectively from five different object pools in the old generation memory. Deserialization to obtain a parent object and deserialization to obtain a child object may be performed in any order. Specifically, the parent object may be obtained through deserialization before the child object is obtained through deserialization, and a pointer pointing to an object shell of the child object is filled into an object shell of the parent object; or the child object may be obtained through deserialization before the parent object is obtained through deserialization, and a pointer pointing to an object shell of the child object is filled into an object shell of the parent object. No limitation is imposed on an order of performing the two operations in this embodiment.

Figure 8:
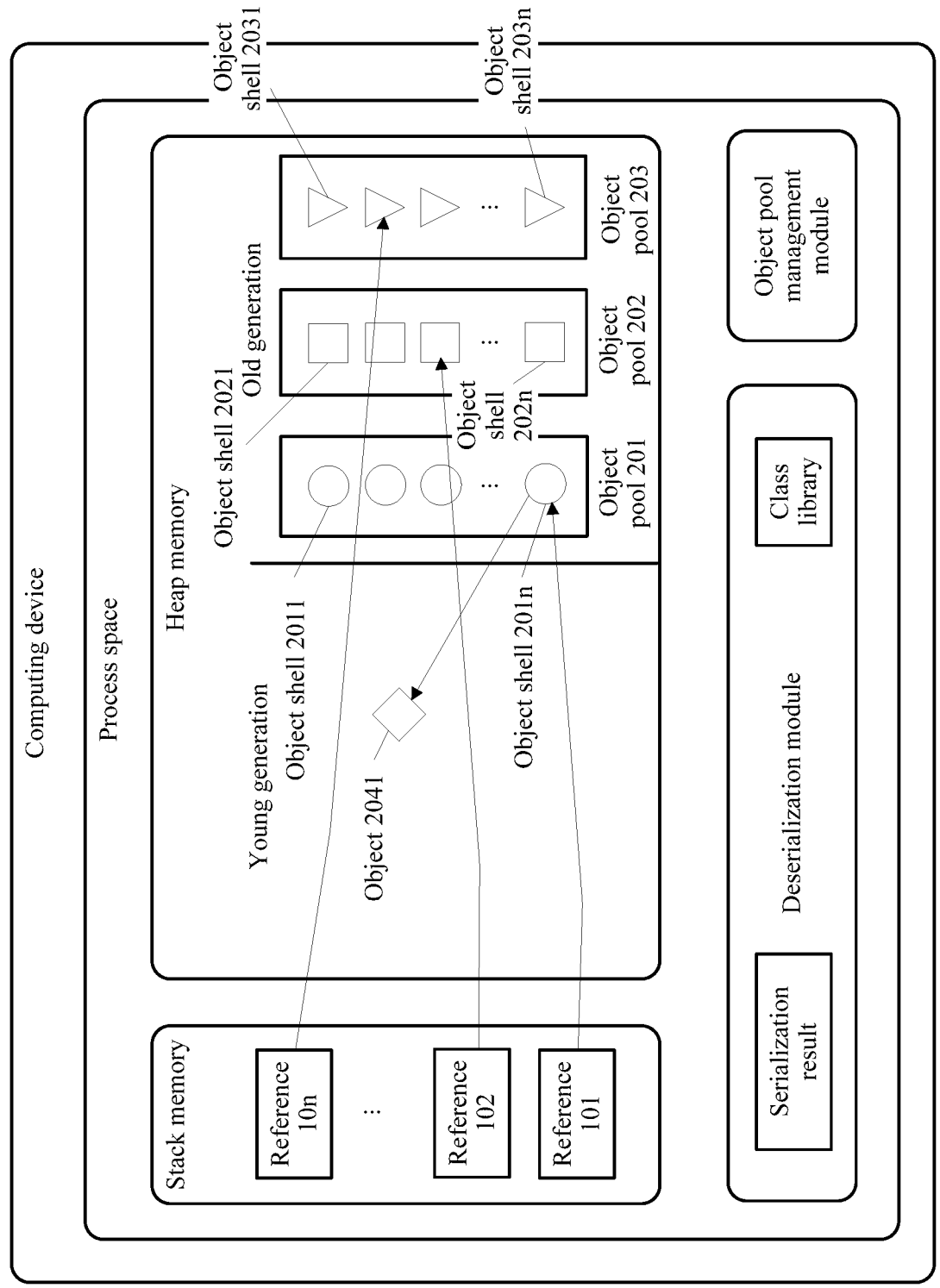
FIG. 8 is a schematic structural diagram of another computing device according to this application.

For an object that is of a reference type and whose length is not fixed (with a variable length), such as an object of a String type, an object of a Map type, an object of a List type, or an object of an Array type, because a length of an element included in the variable-length object of the reference type is usually not fixed, it is not convenient to pre-create an object pool and an object shell for a class to which the variable-length object of the reference type belongs. Therefore, one of the following two solutions may be used:

1. No object pool is created for the variable-length object of the reference type. As shown in FIG. 8, when a variable-length object of the reference type needs to be created, the variable-length object 2041 of the reference type is created in the young generation, and a pointer pointing to the object 2041 created in the young generation is filled into element space of an object shell 201*n*. The object 2041 is a child object of an object corresponding to the object shell 201*n*, that is, one of elements of the object corresponding to the object shell 201*n* is the object 2041. An object userID of the String type in FIG. 6 is used as an example. The object userID of the String type is nested in the object EventData1. In a procedure of obtaining EventData1 through deserialization, the object userID of the string type is created in the young generation, and an address of the object of the String type in the young generation is used as a pointer, to fill the pointer into corresponding element space in an object body of the created EventData1. In this case, in FIG. 6, a pointer of String1 points to an object String1 that is of the string type and that is created in the young generation.

2. An object pool is still created for the variable-length object of the reference type, and a length of element space of an object shell in the object pool is N (N is a quantity of elements included in the object). When a variable-length object of the reference type needs to be created, a value relationship between N and the length M of the elements of the variable-length object of the reference type is determined. If N is not less than M, the variable-length object of the reference type is created based on an idle object shell in the pool. If N is less than M, the variable-length object of the reference type is created in the young generation, and a pointer pointing to the variable-length object that is of the reference type and that is created in the young generation is filled into element space of the object shell. After the variable-length object of the reference type is used, an element that is of the variable-length object of the reference type and that is in an object body in the young generation is cleared, and the object existing after clearance is added, as an object shell, to an object pool of a class to which the variable-length object of the reference type belongs. In this way, if a length of the variable-length object that is of the reference type and that needs to be created next time is greater than N and less than M, the newly added object shell may be used to create the variable-length object of the reference type.

Figure 7:
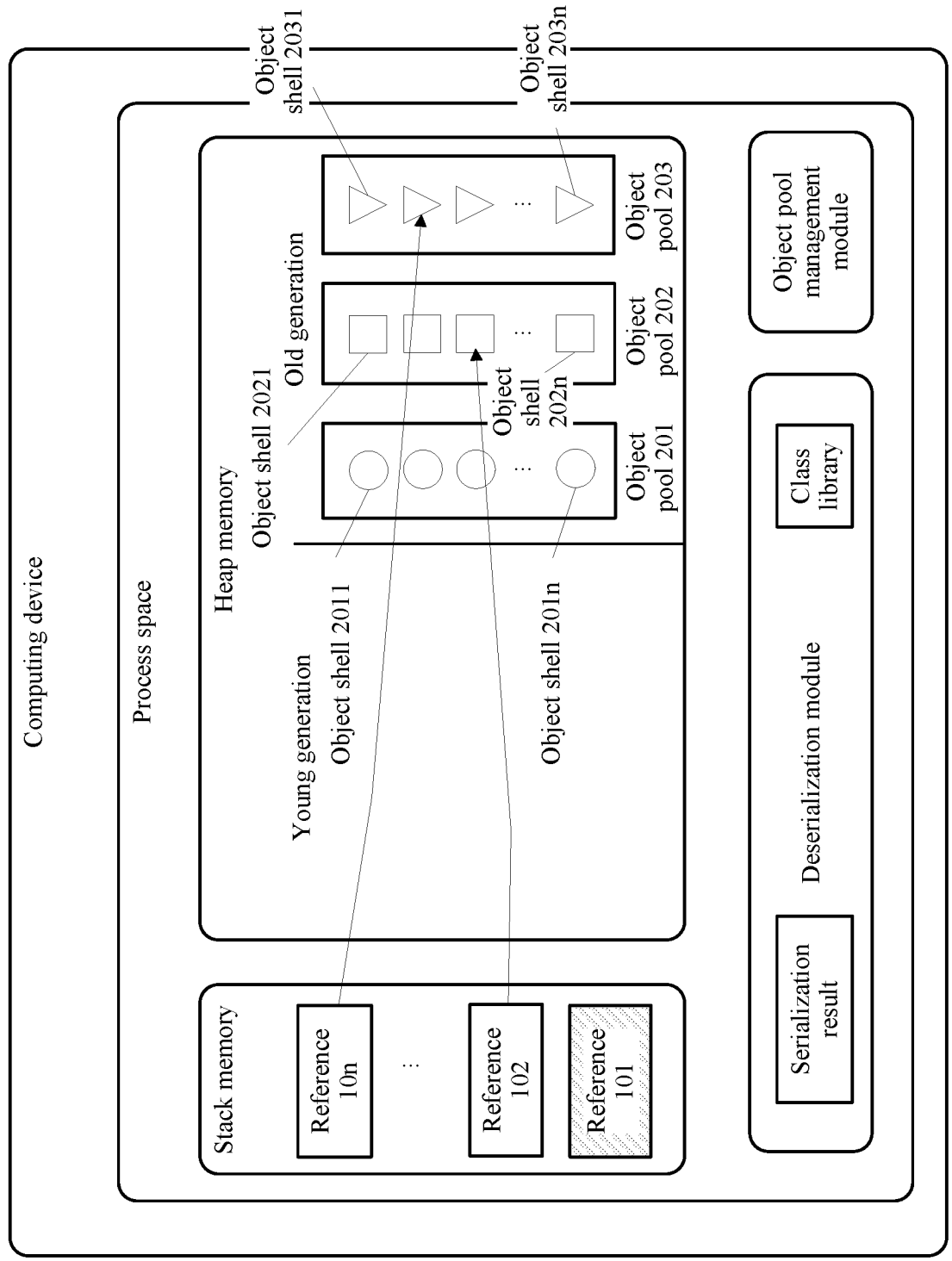
FIG. 7 is a schematic structural diagram of another computing device according to this application.

After an object is used by the process, the object is released. When the object is released, a reference of the object is deleted from the stack memory, and an object shell borrowed in a procedure of obtaining the object through deserialization is released and returned back to a corresponding object pool. In a procedure of releasing an object shell, the object pool management module clears content recorded in an object body of the object shell, that is, empties space reserved in the object body for an element. The object shell still has the space, but the space no longer records an element or a pointer. In addition, a type pointer recorded in an object header of the object shell is not cleared. After releasing an object shell, the object pool management module records, in the object pool status information, that the object shell is in an idle state, so that the object shell can be borrowed for another object. As shown in FIG. 7, after an object corresponding to the reference 101 is used, the reference 101 is deleted, and the object shell 201*n* and the object shell 202n that are borrowed for the object each are released and returned back to a corresponding pool.

Figure 9A:
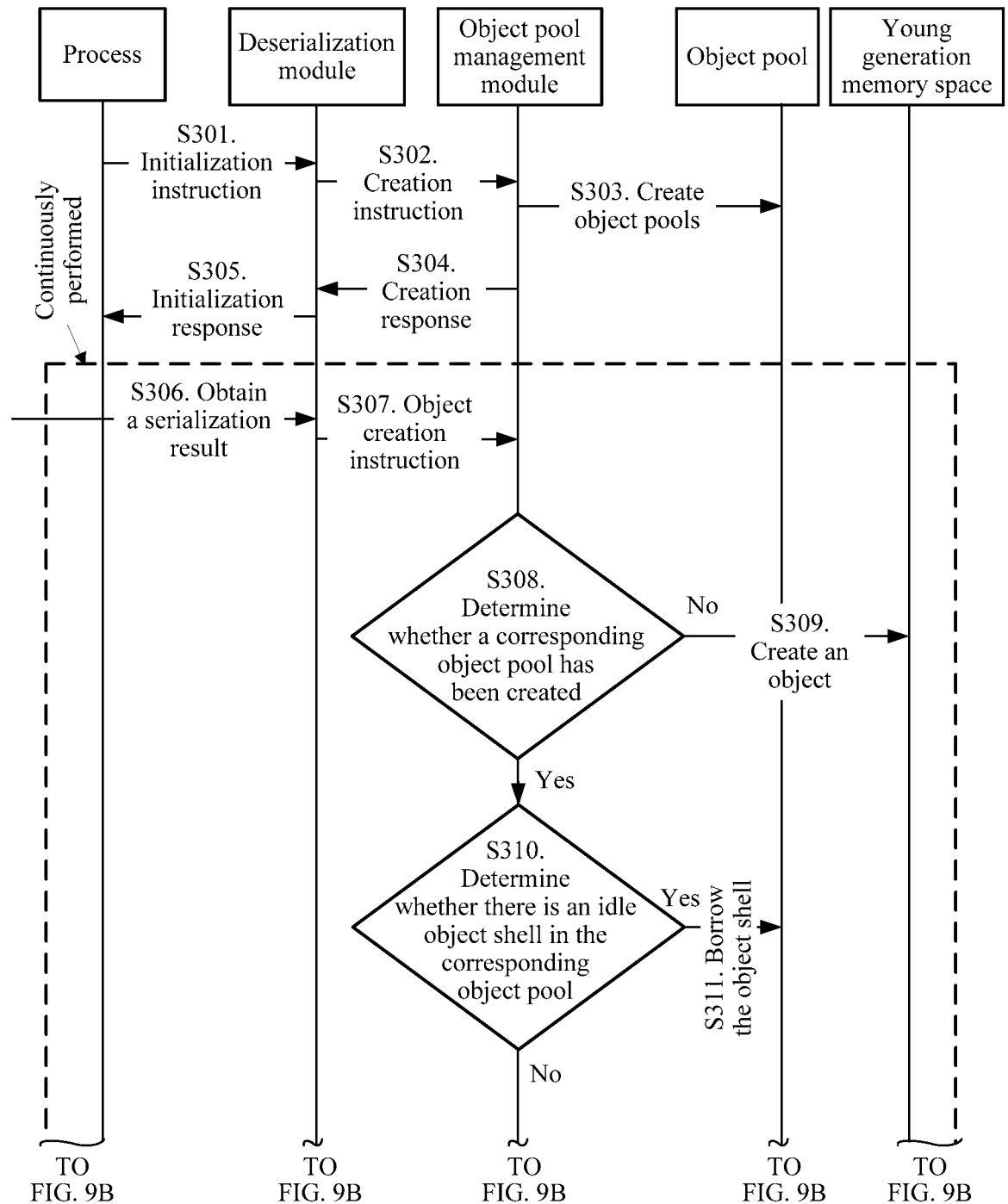
FIG. 9A and FIG. 9B are a schematic flowchart of deserialization according to this application.
Figure 9B:
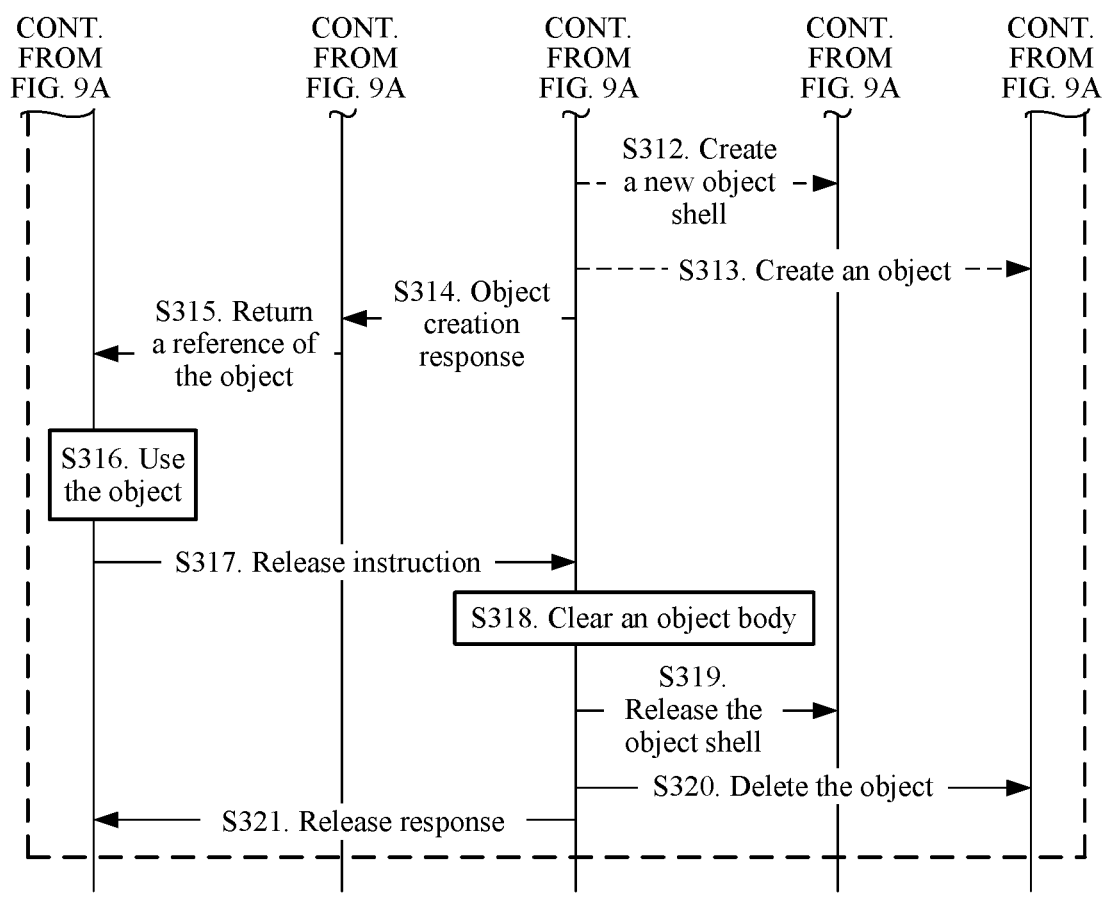

The following uses FIG. 9A and FIG. 9B as an example to describe a complete life cycle that is of an object and that is from deserialization to release.

S301. A process begins to run, and sends an initialization instruction to a deserialization module. After the process that runs on a computing device is started, the deserialization module is instructed, by using the initialization instruction, to perform initialization. The initialization instruction may carry information such as a class to which an object that may be used subsequently by the process belongs, and an estimated quantity/proportion of each object obtained by instantiating a class.

S302. The deserialization module sends a creation instruction to an object pool management module based on the initialization instruction. The creation instruction may carry the information such as the class to which the object that may be subsequently used by the process belongs, and the quantity/proportion of each object obtained by instantiating the class, so that the object pool management module determines classes corresponding to to-be-created object pools and a quantity of object shells in each object pool.

S303. The object pool management module creates the object pools and object pool status information in memory space based on the creation instruction. For the types of the created object pools and the quantity of object shells in each object pool, refer to the information carried in the creation instruction.

S304. The object pool management module completes object pool creation, and returns a creation response to the deserialization module.

S305. The deserialization module returns an initialization response to the process based on the creation response.

After completing object pool initialization, the deserialization module begins to continuously receive serialization results, and converts each serialization result into an object through deserialization. A deserialization procedure includes S307 to S315. For each serialization result, S306 to S321 are performed. Therefore, as serialization results are continuously obtained, S306 to S321 are continuously performed repeatedly.

S306. The deserialization module obtains a serialization result. The deserialization module creates a reference such as a reference 101, and the reference points to an object shell of an object corresponding to the serialization result, such as an object shell 201n.

S307. The deserialization module sends an object creation instruction to the object pool management module. The creation instruction carries a class to which the object corresponding to the serialization result belongs and the serialization result obtained in S306.

S308. The object pool management module determines, based on the class to which the object belongs, whether an object pool corresponding to the class to which the object belongs has been created in S301 to S305; and if the object pool corresponding to the class to which the object belongs is not created in S301 to S305, performs S309; or if the object pool corresponding to the class to which the object belongs has been created in S301 to S305, performs S310 to S313.

S309. Because the corresponding object pool is not created, the object pool management module creates the object in a young generation.

S310. The object pool management module determines whether there is still an idle object shell in the object pool corresponding to the class to which the object belongs, for example, the object pool 201. If there is still an idle object shell, the object pool management module performs S311; or if there is no idle object shell, the object pool management module performs S312 or S313.

In a running procedure of the process, if all object shells in an object pool are borrowed, the object pool lacks an object shell that can be borrowed, for example, a branch with a determining result "no" in S310, or the object management module determines that a deserialization frequency of an object is increased. In either of the two cases, the object pool management module may create a new object shell for the object pool. If the object shell in the object pool is frequently borrowed, the newly created object shell may be retained in the object pool for a long time. Alternatively, after the newly created object shell is used, or after the newly created object shell survives for a specific period/time, the object pool management module may delete the newly created object shell to make room in old generation memory space for creating a new object pool or creating an object shell for another object pool. To avoid insufficient space of another object pool due to an excessively large quantity of object shells in an object pool, the object pool management module may design an upper limit for a quantity of object shells in the object pool, or design an upper limit for memory space occupied by the object pool. Before the upper limit is reached, if object shells in the object pool are insufficient, the object pool management module may create a new object shell for the object pool. If the quantity of object shells in the object pool reaches the upper limit, or the memory space occupied by the object pool reaches the upper limit, even though the object shells in the object pool are insufficient, the object pool management module cannot create a new object shell for the object pool. In this case, if the deserialization module still requests to obtain the object through deserialization, the object pool management module returns an exception response to the deserialization module to notify the deserialization module that the object currently cannot be obtained through deserialization, or the object pool management module creates the object in young generation memory space.

S311. The object pool management module borrows an idle object shell from the object pool corresponding to the object, for example, the object shell 201n, and creates the object by using the object shell 201n. The object pool management module fills the serialization result into space reserved in an object body of the object shell 201n for an element of the object. If an element of the object is of a basic type, a part that is related to the element of the basic type and that is in the serialization result is filled into space reserved in the object body for the element. If an element of the object is of a reference type, the object pool management module borrows another idle object shell 202n from an object pool of a class to which an object corresponding to the element belongs, for example, from an object pool 202. The object pool management module fills a pointer of the object shell 202n into space reserved in the object body of the object shell 201n for the element of the reference type, and fills, into space reserved in an object body of the object shell 202n for the element of the object of the reference type, a part that is related to the element of the reference type and that is in the serialization result.

S312. The object pool management module creates a new object shell in the object pool 201, and creates the object based on the newly created object shell. A method for creating the object based on the newly created object shell is the same as the foregoing method.

S313. The object pool management module creates the object in the young generation memory space.

S314. After creating the object, the object pool management module returns an object creation response to the deserialization module.

S315. The deserialization module returns the reference 101 of the object to the process.

S316. The process uses the object by using the reference 101.

For each serialization result, S306 to S316 and S317 to S321 may not be performed continuously. That is, after S306 to S316 are performed for a plurality of serialization results, only an object corresponding to one of the serialization results needs to be released by the process.

S317. After using the object, the process sends a release instruction to the object pool management module. After obtaining the release instruction, the object pool management module performs S318 and S319 or performs S320 based on a step performed when the object is created. If S311 or S312 is used when the object is created, the object pool management module performs S318 and S319. If S309 or S313 is used when the object is created, the object pool management module performs S320.

S318. The object pool management module clears the borrowed object shell based on the release instruction, that is, clears the space reserved in the object body of the object shell 201n for the element, and does not clear an object header of the object shell. If there are a plurality of layers of object nesting, an object shell borrowed for an object nested at each layer is cleared by using the method.

S319. The object pool management module releases and returns the cleared object shell 201n to the object pool 201. The object pool management module records, in the object pool status information, that the object shell 201n is in an idle state.

S320. The object pool management module deletes the object from the young generation memory space.

S321. After S319 or S320, the object pool management module returns a release response to the process, to notify the process that the object 201 has been released.

After S321, if the process receives another serialization result, and a same class is used for the another serialization result and the serialization result received in S306, that is, the two serialization results are obtained by instantiating a same class, the deserialization module and the object pool management module may create, by using the object shell 201 released in S306 to S321, an object corresponding to the another serialization result. For a procedure of creating the object based on the released object shell 201, refer to S306 to S321.

Figure 10:
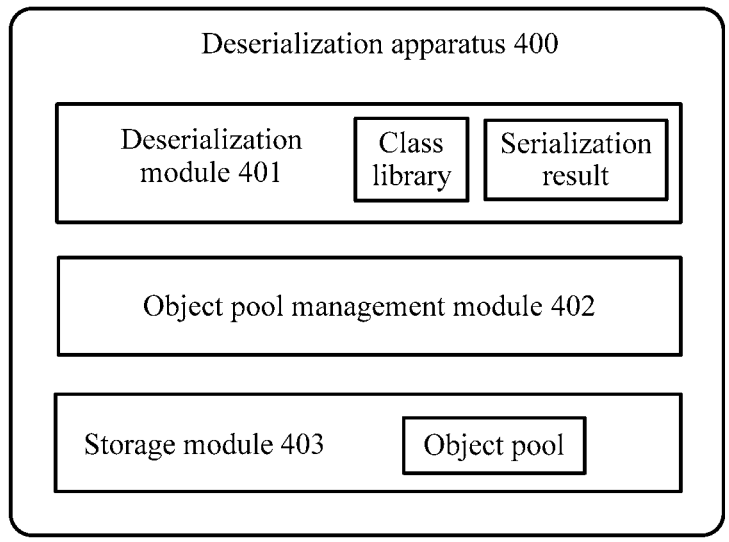
FIG. 10 is a schematic structural diagram of a deserialization apparatus according to this application.

FIG. 10 provides a deserialization apparatus 400. The deserialization apparatus 400 includes a deserialization module 401, an object pool management module 402, and a storage module 403. Communication is established between the deserialization module 401 and the object pool management module 402, and communication is established between the object pool management module 402 and the storage module 403. The deserialization apparatus 400 may be a part of process space in the foregoing figures. The deserialization apparatus 400 and various modules included in the deserialization apparatus 400 may be software modules. The deserialization module 401 stores a serialization result and a class library. The storage module 403 stores various object pools. The storage module 403 is old generation memory space in the foregoing figures, or is a part of old generation memory space. The deserialization apparatus 400 supports a deserialization function, and an object obtained through deserialization is used by a process.

Figure 11:
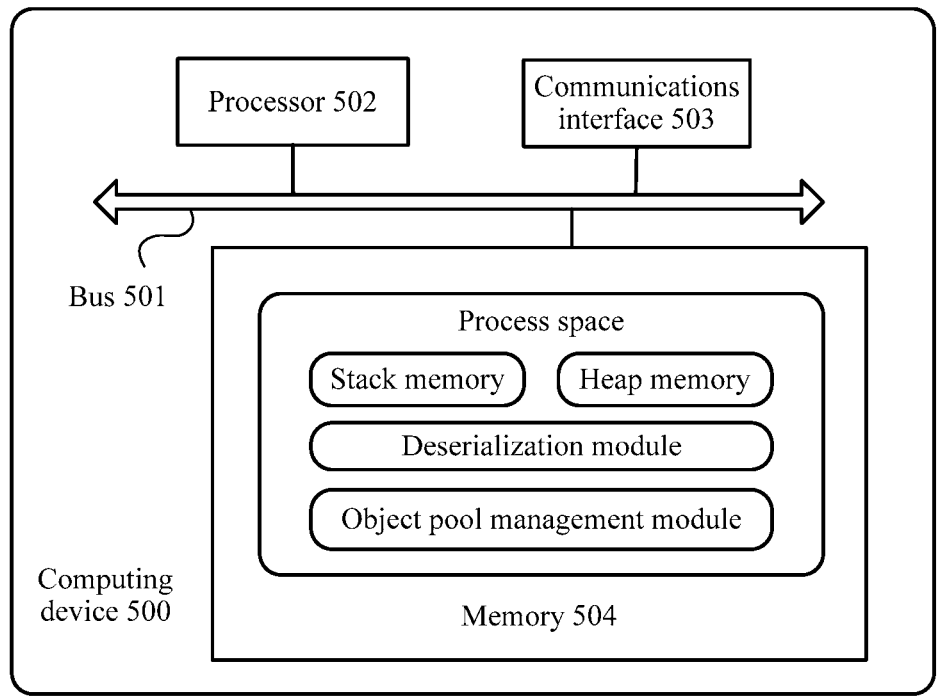
FIG. 11 is a schematic structural diagram of another computing device according to this application.

FIG. 11 provides a computing device 500. The computing device 500 includes a bus 501, a processor 502, a communications interface 503, and a memory 504. The processor 502, the memory 504, and the communications interface 503 communicate with each other by using the bus 501. The communications interface 503 is configured to communicate with the outside, for example, receive a serialization result.

The processor 502 may be a central processing unit (CPU). The memory 504 may include a volatile memory, for example, a random access memory (RAM). Alternatively, the memory 504 may include a non-volatile memory, for example, a read-only memory (ROM), a flash memory, an HDD, or an SSD.

The memory 504 stores executable code, and the processor 502 executes the executable code to perform the foregoing deserialization method. Specifically, the memory 504 stores the foregoing process space that includes the foregoing stack memory, heap memory, deserialization module, and object pool management module. When the computing device 500 runs, the memory 504 provides the foregoing process space for use. In addition to storing the process space, the memory 504 may further include another software module such as an operating system required for process running. The operating system may be LINUX™, UNIX™, WINDOWS™, or the like.

The descriptions of procedures corresponding to the foregoing drawings have respective focuses. For a part that is not described in detail in a procedure, refer to related descriptions of another procedure.

All or some of the foregoing embodiments may be implemented by using software, hardware, firmware, or any combination thereof. When the software is used to implement the embodiments, the embodiments may be all or partially implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

What is claimed is:

1. A method for performing deserialization by a computing device, comprising:
starting a process and sending an initialization instruction to a deserialization module of the computing device, wherein the initialization instruction comprises information about a class to which a first object belongs which is subsequently used by the process, sending, by the deserialization module, a creation instruction to an object pool management module based on the initialization instruction, wherein the creation instruction comprises a) the information about the class to which the first object belongs which is subsequently used by the process and b) a quantity or proportion of each object obtained by instantiating the class, wherein the quantity or proportion of each object obtained by instantiating the class is based on an estimated frequency that an object obtained by instantiating the class is invoked, so that the object pool management module determines classes corresponding to to-be-created object pools and a quantity of object shells in each object pool;

creating the object pools and object pool status information in memory space of the process based on the creation instruction, wherein one of the object pools comprises a first object shell of the first object, wherein the first object shell is created in old generation memory space of the process, wherein the first object shell comprises a first object header and a first object body, the first object header comprises a type pointer of the first object, and space is reserved in the first object body for an element of the first object, and wherein the object pool status information records which object shell is idle and which object shell is being borrowed in each object pool;

obtaining a serialization result of the first object;

obtaining the first object shell; and deserializing the serialization result of the first object based on the first object shell, to obtain the first object.

2. The method according to claim 1, wherein the first object shell is located in an object pool corresponding to a class to which the first object belongs, wherein the object pool corresponding to the class to which the first object belongs comprises at least one object shell, and the method further comprises:

selecting the idle first object shell from the object pool corresponding to the class to which the first object belongs, to deserialize the serialization result of the first object; and after the first object is used by the process, releasing the first object shell, wherein the released first object shell is idle.

3. The method according to claim 2, wherein the releasing the first object shell comprises:

clearing the space reserved in the first object body for the element of the first object.

4. The method according to claim 1, wherein the deserializing the serialization result of the first object based on the first object shell, to obtain the first object comprises:

creating a reference for the first object, wherein the reference points to the first object shell: and filling the serialization result of the first object into the space reserved in the first object body for the element of the first object.

5. The method according to claim 1, wherein the method further comprises:

creating a second object shell of an object of a reference type in the memory space of the process, wherein the second object shell comprises a second object header and a second object body, the second object header comprises a type pointer of the object of the reference type, space is reserved in the second object body for an element of the object of the reference type, and the object of the reference type is an element of the first object, wherein the deserializing the serialization result of the first object based on the first object shell, to obtain the first object comprises:

filling a pointer pointing to the second object shell into space reserved in the first object body for an element of the reference type; and filling, into the space reserved in the second object body for the element of the object of the reference type, a part that is related to the element of the reference type and that is in the serialization result of the first object.

6. The method according to claim 2, wherein after the releasing the first object shell, the method further comprises:

obtaining a serialization result of a second object, wherein the second object and the first object belong to a same class; and obtaining the released first object shell, and deserializing the serialization result of the second object based on the released first object shell, to obtain the second object.

7. A computing device, comprising a processor and a memory storing instructions, wherein when the instructions are executed by the processor, the processor is configured to:

start a process and send an initialization instruction to a deserialization module of the computing device, wherein the initialization instruction comprises information about a class to which a first object belongs which is subsequently used by the process, send, by the deserialization module, a creation instruction to an object pool management module of the computing device based on the initialization instruction, wherein the creation instruction comprises a) the information about the class to which the first object belongs which is subsequently used by the process and b) a quantity or proportion of each object obtained by instantiating the class, wherein the quantity or proportion of each object obtained by instantiating the class is based on an estimated frequency that an object obtained by instantiating the class is invoked, so that the object pool management module determines classes corresponding to to-be-created object pools and a quantity of object shells in each object pool;

create the object pools and object pool status information in memory space of the process based on the creation instruction, wherein one of the object pools comprises a first object shell of the first object, wherein the first object shell is created in old generation memory space of the process, wherein the first object shell comprises a first object header and a first object body, the first object header comprises a type pointer of the first object, and space is reserved in the first object body for an element of the first object, and wherein the object pool status information records which object shell is idle and which object shell is being borrowed in each object pool;

obtain a serialization result of the first object;

obtain the first object shell; and deserialize the serialization result of the first object based on the first object shell, to obtain the first object.

8. The device according to claim 7, wherein the first object shell is located in an object pool corresponding to a class to which the first object belongs, wherein the object pool corresponding to the class to which the first object belongs comprises at least one object shell: and when the instructions are executed by the processor, the processor is configured to: select the idle first object shell from the object pool corresponding to the class to which the first object belongs, to deserialize the serialization result of the first object; and after the first object is used by the process, release the first object shell, wherein the released first object shell is idle.

9. The device according to claim 7, wherein when the instructions are executed by the processor, the processor is configured to clear the space reserved in the first object body for the element of the first object.

10. The device according to claim 7, wherein when the instructions are executed by the processor, the processor is configured to:
   create a reference for the first object, wherein the reference points to the first object shell: and
   fill the serialization result of the first object into the space reserved in the first object body for the element of the first object.

11. The device according to claim 7, wherein when the instructions are executed by the processor, the processor is configured to:
   create a second object shell of an object of a reference type in the memory space of the process, wherein the second object shell comprises a second object header and a second object body, the second object header comprises a type pointer of the object of the reference type,
   space is reserved in the second object body for an element of the object of the reference type, and the object of the reference type is an element of the first object;
   fill a pointer pointing to the second object shell into space reserved in the first object body for an element of the reference type; and
   fill, into the space reserved in the second object body for the element of the object of the reference type, a part that is related to the element of the reference type and that is in the serialization result of the first object.

12. The device according to claim 7, wherein when the instructions are executed by the processor, the processor is configured to: obtain a serialization result of a second object, wherein the second object and the first object belong to a same class; and obtain the released first object shell, and deserialize the serialization result of the second object based on the released first object shell, to obtain the second object.

13. A non-transitory computer-readable storage medium storing instructions, which when executed by a computing device, cause the computing device to perform the following method:
   starting a process and sending an initialization instruction to a deserialization module of the computing device, wherein the initialization instruction comprises information about a class to which a first object belongs which is subsequently used by the process,
   sending, by the deserialization module, a creation instruction to an object pool management module based on the initialization instruction, wherein the creation instruction comprises a) the information about the class to which the first object belongs which is subsequently used by the process and b) a quantity or proportion of each object obtained by instantiating the class, wherein the quantity or proportion of each object obtained by instantiating the class is based on an estimated frequency that an object obtained by instantiating the class is invoked, so that the object pool management module determines classes corresponding to to-be-created object pools and a quantity of object shells in each object pool;
   creating the object pools and object pool status information in memory space of the process based on the creation instruction, wherein one of the object pools comprises a first object shell of the first object, wherein the first object shell is created in old generation memory space of the process, wherein the first object shell comprises a first object header and a first object body, the first object header comprises a type pointer of the first object, and space is reserved in the first object body for an element of the first object, and wherein the object pool status information records which object shell is idle and which object shell is being borrowed in each object pool;
   obtaining a serialization result of the first object;
   obtaining the first object shell; and
   deserializing the serialization result of the first object based on the first object shell, to obtain the first object.

* * * * *